March 9, 1965 PER-OLOF WEMAN 3,172,701
SAFETY BELTS HAVING CHEST AND HIP STRAPS
Filed Jan. 24, 1963

Inventor
Per-Olof Weman
By Karl W. Flocks
Attorney

United States Patent Office 3,172,701
Patented Mar. 9, 1965

3,172,701
SAFETY BELTS HAVING CHEST AND HIP STRAPS
Per-Olof Weman, Stockholm, Sweden, assignor to AB Bröderna Ottosson & Co., Klippan, Sweden, a corporation of Sweden
Filed Jan. 24, 1963, Ser. No. 253,687
6 Claims. (Cl. 297—389)

This invention relates to a safety belt for the occupants of motor vehicles, said belt having chest and hip straps. A safety belt of this type is described inter alia in U.S. Patents 2,710,649 to Griswold et al. of June 14, 1955, 2,804,313 to Gilles of August 27, 1957, and 3,043,625 to Bohlin of July 10, 1962.

In order that such a safety belt may not, in case of collision, inflict damages to the internal organs of the driver or passenger strapped in his seat, the belt must not be entirely rigid for in such a case there is the risk that in case of collision the head and heart of the seat occupant will be subject to so heavy an acceleration relative to the rest of the body that the seat occupant may break his neck or tear his arteries. The safety belt must therefore yield in order to provide a gentle deceleration of the seat occupant but this yield must not be elastic for the vital injuries mentioned can then result when the body of the seat occupant is pulled against the seat when the safety belt springs back (so-called slingshot effect). As a matter of fact, forces equally large as during the fall forward act on the body when the safety belt springs back, and on account of the softness of the human body these forces may give rise to secondary internal shocks between the organs of the body, resulting for example in torn arteries. This is why the safety belt must essentially be plastic. The importance of this has been realized for a rather long time now and it has also been realized that the plastically stretchable seat belt after having fulfilled its vital function after collision has to be replaced by a new unstretched safety belt. On the other hand, one has not considered that the safety belt may have a function to fulfill also immediately after the actual collision moment. In case the vehicle should turn over immediately after the collision and roll down a slope it is of course of the utmost importance that the safety belt still retains the seat occupant to the seat to prevent him being thrown out of the vehicle and being subject to vital injuries, but a plastically stretched safety belt might not be able to fulfill such function.

With a view to eliminating this risk and to further perfecting the safety belt it is suggested according to the present invention to arrange the chest strap in such a way that it is capable of stretching to a limited extent when loaded to a result of a collision but has no possibility, when the load decreases, of essentially returning to its normal position in which it tightly extends over the thorax of the seat occupant, while the hip strap is arranged so as to be relatively rigid or elastically yieldable to a limited extent. In a safety belt so designed the gentle braking is attained in that the chest strap yields in order to protect the neck and head of the seat occupant while his body is simultaneously safely retained against the seat by the hip strap also after the chest strap has played its role and does no longer fully contribute to the retention of the seat occupant.

For elucidation, some embodiments of the invention will be described more in detail in the following, reference being made to the accompanying drawing in which.

Figure 1:
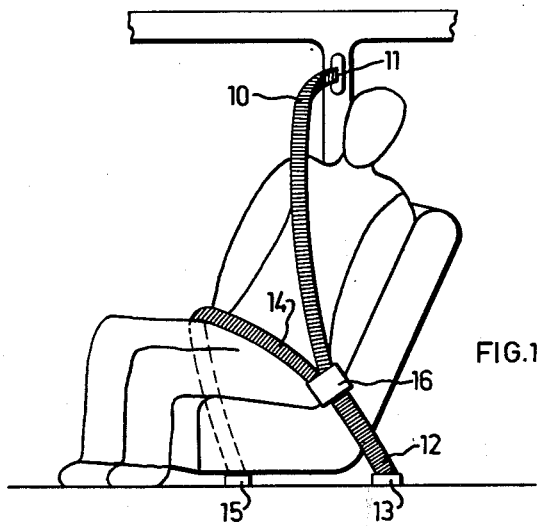
FIG. 1 is a view showing a safety belt according to the invention in position of use over the seat.

The safety belt shown in FIG. 1 comprises an upper web 10 which has one end anchored to the vehicle body at a point 11 on one side of the seat near shoulder level and preferably behind the seat, a lower web 12 which has one end anchored at a point 13 on the vehicle floor on the opposite side of the seat and preferably behind it, and a transverse web 14 which has one end anchored in the vehicle body at a point 15 on the same side of the seat as point 11. Webs 10 and 14 are releasably connected together at their other ends with the other end of web 12 by means of a buckle 16.

In accordance with the invention, the upper web 10 of the safety belt shown in FIG. 1 may be a strap which mainly is plastically stretchable to a limited extent while the lower web 12 and the transverse web 14 are straps which mainly are elastically stretchable to a limited extent or are relatively rigid. This design may also be applied when the lower web 12 is lacking and webs 10 and 14 are directly connected with the vehicle body at point 13 by means of buckle 16.

The terms "plastically stretchable" and "elastically stretchable" are understood to apply to the properties possessed by the respective portions of the belts. Both the plastically stretchable and elastically stretchable belts will yield and stretch under the force of collision but the elastically stretchable belt will pull back to its original shape as soon as the force is removed while the plastically stretchable belt will remain in its stretched form.

Figure 2:
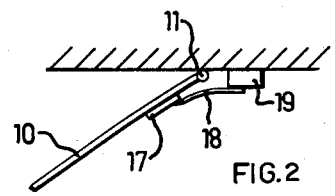
FIGS. 2 and 3 are schematic views showing an arrangement to prevent the chest strap being tightened after the collision moment.
Figure 3:
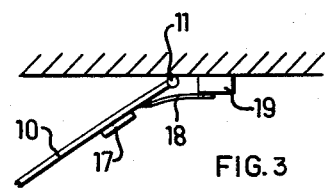

It is not necessary, however, that the upper web 10 be plastically stretchable as it may also be elastically stretchable, which is to advantage in case webs 10 and 14 are made in an integral piece and are connectible by means of buckle 16 with the lower web 12 or directly with the vehicle body at anchorage point 13. In such a case, however, the said slingshot effect must be prevented in respect of the upper web 10, which may be realized in the way shown in FIGS. 2–3.

Arrangements may be envisaged in which the return movement, during which the web is released, relies wholly on the inherent elasticity of the web, no separate spring means being provided. Thus, in the construction shown in FIGS. 2 and 3 web 10 is provided in proximity to anchorage point 11 with an abutment of metal or plastic material which has been glued or otherwise affixed to the web to coact with a blade 18 which is mounted adjacent to anchorage point 11, at an attachment 19, and has its edge directed towards web 10. The abutment 17 is so arranged relative to the blade 18 that when web 10 is stretched the abutment slides away from the edge of the blade which is directed towards said web 10. Thus the said edge comes into contact with web 10 and, as the web 10 commences to spring back elastically, it cuts off the web 10 wholly or partly from anchorage point 11. The slingshot effect may not be entirely prevented but it will be very much reduced. Moreover, the inherent elasticity of the body will not itself bring about springing back of the body, such as might otherwise occur if the thorax should be compressed by, for example, as much as 50%.

Webs 10 and 14 must be connected with the buckle 16 or a locking tongue cooperating therewith. They may be made either as separate parts or integrally in one piece, in such a way that elastic springing back of the hip strap is not transmitted to the chest strap and, conversely that the slackness of the chest strap is not transmitted to the hip strap.

What I claim and desire to secure by Letters Patent is:
1. In a vehicle, a safety belt comprising
a chest strap and a hip strap anchored in said vehicle,
said chest strap being stretchable to a limited extent when loaded as a result of collision and non-return- able, upon decrease of the load, to its normal position in which it is held tightly over the thorax of the seat occupant,
and said hip strap being substantially non-stretchable.

2. In a vehicle, a safety belt comprising
a chest strap and a hip strap anchored in said vehicle,
said chest strap being stretchable to a limited extent when loaded as a result of collision and non-returnable, upon decrease of the load, to its normal position in which it is held tightly over the thorax of the seat occupant, and
said hip strap being elastically stretchable to a limited extent.

3. In a vehicle, a safety belt comprising
a chest strap and a hip strap anchored in said vehicle,
said chest strap being elastically stretchable to a limited extent when loaded as a result of collision,
means for retaining an effective increased length of said chest strap when the load decreases,
and said hip strap being substantially non-stretchable.

4. In a vehicle, a safety belt comprising
a chest strap and a hip strap anchored in said vehicle,
said chest strap being elastically stretchable to a limited extent when loaded as a result of collision,
means for retaining an effective increased length of said chest strap when the load decreases,
and said hip strap being elastically stretchable to a limited extent.

5. In a vehicle, a safety belt comprising
a chest strap and a hip strap anchored in said vehicle,
said chest strap being elastically stretchable to a limited extent when loaded as a result of collision,
means for at least partly cutting off said chest strap from an anchor point of said chest strap in the vehicle when the load decreases,
and said hip strap being substantially non-stretchable.

6. In a vehicle, a safety belt comprising
a chest strap and a hip strap anchored in said vehicle,
said chest strap being elastically stretchable to a limited extent when loaded as a result of collision,
means for at least partly cutting off said chest strap from an anchor point of said chest strap in the vehicle when the load decreases,
and said hip strap being elastically stretchable to a limited extent.

References Cited by the Examiner

UNITED STATES PATENTS

| | | | |
|---|---|---|---|
| 2,576,867 | 11/51 | Wilson | 297—389 |
| 2,710,649 | 6/55 | Griswold | 297—389 |
| 2,804,313 | 8/57 | Gilles | 297—389 |
| 2,823,046 | 2/58 | Banta | 297—389 |
| 2,864,437 | 12/58 | Spring | 297—389 |
| 3,043,625 | 7/62 | Bohlin | 297—389 |

FOREIGN PATENTS 1,186,353   2/59   France.

FRANK B. SHERRY, *Primary Examiner.*